United States Patent
Yu et al.

(10) Patent No.: US 10,371,861 B2
(45) Date of Patent: Aug. 6, 2019

(54) NOTIFICATION TECHNIQUES FOR REDUCING ENERGY USAGE

(71) Applicant: Opower, Inc., Arlington, VA (US)

(72) Inventors: Suelyn Yu, San Francisco, CA (US); Garner Chung, Oakland, CA (US); David Royer, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 346 days.

(21) Appl. No.: 14/848,097

(22) Filed: Sep. 8, 2015

(65) Prior Publication Data

US 2016/0238740 A1    Aug. 18, 2016

Related U.S. Application Data

(60) Provisional application No. 62/116,242, filed on Feb. 13, 2015.

(51) Int. Cl.
*G01W 1/10* (2006.01)
*G06Q 50/06* (2012.01)

(52) U.S. Cl.
CPC .............. *G01W 1/10* (2013.01); *G06Q 50/06* (2013.01)

(58) Field of Classification Search
CPC ..... G01W 1/10; G01W 1/12; G01W 2203/00; G06Q 50/06; G06Q 501/04
USPC .............. 702/3, 150, 189; 700/287
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,930,803 A | 7/1999 | Becker et al. | |
| 5,948,303 A | 9/1999 | Larson | |
| 6,035,285 A | 3/2000 | Schlect et al. | |
| 6,088,688 A | 7/2000 | Crooks et al. | |
| 6,295,504 B1 | 9/2001 | Ye et al. | |
| 6,327,605 B2 | 12/2001 | Arakawa et al. | |

(Continued)

FOREIGN PATENT DOCUMENTS

AU    2010315015    7/2014
CA       2779754     5/2011

(Continued)

OTHER PUBLICATIONS

International Search Report and Written Opinion for PCT Application No. PCT/US2015/038692, dated Sep. 24, 2015, 13 pages.

(Continued)

*Primary Examiner* — Dzung Tran

(74) *Attorney, Agent, or Firm* — Kraguljac Law Group, LLC

(57) ABSTRACT

Notification techniques for reducing energy usage include detecting a weather event for a location of at least one consumer, determining, based on the weather event, at least one modified behavior to reduce energy usage for the at least one consumer, and providing a notification to the at least one consumer regarding the at least one modified behavior for the weather event.

10 Claims, 12 Drawing Sheets

(56) References Cited

U.S. PATENT DOCUMENTS

| | | | |
|---|---|---|---|
| D462,077 S | 8/2002 | Greminger | |
| 6,606,104 B1 | 8/2003 | Kondo et al. | |
| 6,701,298 B1 | 3/2004 | Jutsen | |
| 6,732,055 B2 | 5/2004 | Bagepalli et al. | |
| 6,778,945 B2 | 8/2004 | Chassin et al. | |
| 6,785,620 B2 | 8/2004 | Kishlock et al. | |
| 6,972,660 B1 | 12/2005 | Montgomery, Jr. et al. | |
| 7,020,508 B2 | 3/2006 | Stivoric et al. | |
| 7,073,073 B1 | 7/2006 | Nonaka et al. | |
| 7,073,075 B2 | 7/2006 | Freyman et al. | |
| 7,136,710 B1 | 11/2006 | Hoffberg et al. | |
| 7,142,949 B2 | 11/2006 | Brewster et al. | |
| 7,149,727 B1 | 12/2006 | Nicholls et al. | |
| 7,200,468 B2 | 4/2007 | Ruhnke et al. | |
| 7,243,044 B2 | 7/2007 | McCalla | |
| 7,333,880 B2 | 2/2008 | Brewster et al. | |
| 7,356,548 B1 | 4/2008 | Culp et al. | |
| 7,444,251 B2 | 10/2008 | Nikovski et al. | |
| 7,460,502 B2 | 12/2008 | Arima et al. | |
| 7,460,899 B2 | 12/2008 | Almen | |
| 7,552,030 B2 | 6/2009 | Guralnik et al. | |
| 7,561,977 B2 | 7/2009 | Horst et al. | |
| D605,652 S | 12/2009 | Plaisted et al. | |
| 7,878,890 B2 | 2/2011 | Toyohara et al. | |
| 7,991,513 B2 | 8/2011 | Pitt | |
| 8,065,098 B2 | 11/2011 | Gautam | |
| 8,166,047 B1 | 4/2012 | Cohen et al. | |
| D660,867 S | 5/2012 | Marchetti | |
| 8,180,591 B2 | 5/2012 | Yuen et al. | |
| D665,411 S | 8/2012 | Rai et al. | |
| 8,239,178 B2 | 8/2012 | Gray et al. | |
| D667,841 S | 9/2012 | Rai et al. | |
| 8,260,468 B2 | 9/2012 | Ippolito et al. | |
| 8,275,635 B2 | 9/2012 | Stivoric et al. | |
| 8,280,536 B1 | 10/2012 | Fadell et al. | |
| D671,550 S | 11/2012 | Chen et al. | |
| 8,348,840 B2 | 1/2013 | Heit et al. | |
| 8,375,118 B2 | 2/2013 | Hao et al. | |
| 8,417,061 B2 | 4/2013 | Kennedy et al. | |
| 8,428,785 B2 | 4/2013 | Boucher et al. | |
| 8,429,630 B2 | 4/2013 | Nickolov et al. | |
| 8,478,447 B2 | 7/2013 | Fadell et al. | |
| 8,489,245 B2 | 7/2013 | Carrel et al. | |
| D687,445 S | 8/2013 | Fuhrmann | |
| D694,252 S | 11/2013 | Helm | |
| 8,583,288 B1 | 11/2013 | Rossi et al. | |
| D697,526 S | 1/2014 | Bruck et al. | |
| 8,630,741 B1 | 1/2014 | Matsuoka et al. | |
| 8,660,813 B2 | 2/2014 | Curtis et al. | |
| D703,690 S | 4/2014 | MacCubbin et al. | |
| 8,690,751 B2 | 4/2014 | Auphan | |
| D707,245 S | 6/2014 | Bruck et al. | |
| 8,751,432 B2 | 6/2014 | Berg-Sonne et al. | |
| D710,871 S | 8/2014 | McCormack et al. | |
| 8,805,000 B2 | 8/2014 | Derby et al. | |
| 8,818,758 B1 | 8/2014 | Singh et al. | |
| D714,335 S | 9/2014 | Cojuangco et al. | |
| 8,868,248 B2 | 10/2014 | Park | |
| D717,328 S | 11/2014 | Lin | |
| D720,767 S | 1/2015 | Miller et al. | |
| 8,954,849 B2 | 2/2015 | Doi et al. | |
| D725,133 S | 3/2015 | Smirin et al. | |
| D725,664 S | 3/2015 | Nies et al. | |
| D729,268 S | 5/2015 | Nies et al. | |
| D730,386 S | 5/2015 | Ryan et al. | |
| 9,031,703 B2 | 5/2015 | Nakamura et al. | |
| D731,538 S | 6/2015 | Lee | |
| D732,049 S | 6/2015 | Amin | |
| D732,062 S | 6/2015 | Kwon | |
| D740,847 S | 10/2015 | Yampolskiy et al. | |
| 2001/0047290 A1 | 11/2001 | Petras et al. | |
| 2002/0065581 A1 | 5/2002 | Fasca | |
| 2002/0178047 A1 | 11/2002 | Or et al. | |
| 2002/0198629 A1 | 12/2002 | Ellis | |
| 2003/0011486 A1 | 1/2003 | Ying | |
| 2003/0018517 A1 | 1/2003 | Dull et al. | |
| 2003/0023467 A1 | 1/2003 | Moldovan | |
| 2003/0216971 A1 | 11/2003 | Sick et al. | |
| 2004/0024717 A1 | 2/2004 | Sneeringer | |
| 2004/0111410 A1 | 6/2004 | Burgoon et al. | |
| 2004/0140908 A1 | 7/2004 | Gladwin et al. | |
| 2005/0125083 A1* | 6/2005 | Kiko | G05B 15/02 700/19 |
| 2005/0257540 A1 | 11/2005 | Choi et al. | |
| 2006/0089851 A1 | 4/2006 | Silby et al. | |
| 2006/0093222 A1 | 5/2006 | Saffer et al. | |
| 2006/0103549 A1 | 5/2006 | Hunt et al. | |
| 2006/0195438 A1 | 8/2006 | Galuten | |
| 2006/0246968 A1 | 11/2006 | Dyke-Wells | |
| 2007/0061735 A1 | 3/2007 | Hoffberg et al. | |
| 2007/0185835 A1 | 8/2007 | Ursitti et al. | |
| 2007/0198459 A1 | 8/2007 | Boone et al. | |
| 2007/0203860 A1 | 8/2007 | Golden et al. | |
| 2007/0213992 A1 | 9/2007 | Anderson et al. | |
| 2007/0255457 A1 | 11/2007 | Whitcomb et al. | |
| 2007/0260405 A1 | 11/2007 | McConnell et al. | |
| 2008/0027885 A1 | 1/2008 | van Putten et al. | |
| 2008/0033587 A1 | 2/2008 | Kurita et al. | |
| 2008/0167535 A1 | 7/2008 | Stivoric et al. | |
| 2008/0189632 A1 | 8/2008 | Tien et al. | |
| 2008/0195561 A1 | 8/2008 | Herzig | |
| 2008/0222561 A1 | 9/2008 | Helfman et al. | |
| 2008/0244429 A1 | 10/2008 | Stading | |
| 2008/0281473 A1 | 11/2008 | Pitt | |
| 2008/0281763 A1 | 11/2008 | Yliniemi | |
| 2008/0304112 A1 | 12/2008 | Matsuno | |
| 2008/0306985 A1 | 12/2008 | Murray et al. | |
| 2009/0106202 A1 | 4/2009 | Mizrahi | |
| 2009/0106674 A1 | 4/2009 | Bray et al. | |
| 2009/0204267 A1 | 8/2009 | Sustaeta et al. | |
| 2009/0217175 A1 | 8/2009 | Bechtel et al. | |
| 2009/0217179 A1 | 8/2009 | Mons et al. | |
| 2009/0326726 A1 | 12/2009 | Ippolito et al. | |
| 2010/0025483 A1 | 2/2010 | Hoeynck et al. | |
| 2010/0076835 A1 | 3/2010 | Silverman | |
| 2010/0082174 A1 | 4/2010 | Weaver | |
| 2010/0099954 A1 | 4/2010 | Dickinson et al. | |
| 2010/0106575 A1 | 4/2010 | Bixby et al. | |
| 2010/0138363 A1 | 6/2010 | Batterberry et al. | |
| 2010/0156665 A1 | 6/2010 | Krzyzanowski et al. | |
| 2010/0179704 A1 | 7/2010 | Ozog | |
| 2010/0180223 A1 | 7/2010 | Speier | |
| 2010/0198713 A1 | 8/2010 | Forbes, Jr. et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1 | 8/2010 | Crabtree et al. | |
| 2010/0232671 A1 | 9/2010 | Dam et al. | |
| 2010/0241648 A1 | 9/2010 | Ito et al. | |
| 2010/0286937 A1 | 11/2010 | Hedley et al. | |
| 2010/0289643 A1 | 11/2010 | Trundle et al. | |
| 2010/0324962 A1 | 12/2010 | Nesler et al. | |
| 2010/0332373 A1 | 12/2010 | Crabtree et al. | |
| 2011/0022429 A1 | 1/2011 | Yates et al. | |
| 2011/0023045 A1 | 1/2011 | Yates et al. | |
| 2011/0040666 A1 | 2/2011 | Crabtree et al. | |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |

(56) References Cited

U.S. PATENT DOCUMENTS

| | | | |
|---|---|---|---|
| 2012/0078417 | A1 | 3/2012 | Connell, II et al. |
| 2012/0084063 | A1 | 4/2012 | Drees et al. |
| 2012/0179692 | A1 | 7/2012 | Hsiao et al. |
| 2012/0215369 | A1 | 8/2012 | Desai et al. |
| 2012/0216123 | A1 | 8/2012 | Shklovskii et al. |
| 2012/0259678 | A1 | 10/2012 | Overturf et al. |
| 2012/0290230 | A1 | 11/2012 | Berges Gonzalez et al. |
| 2012/0310708 | A1 | 12/2012 | Curtis et al. |
| 2013/0060531 | A1 | 3/2013 | Burke et al. |
| 2013/0060720 | A1 | 3/2013 | Burke |
| 2013/0097177 | A1 | 4/2013 | Fan et al. |
| 2013/0097481 | A1 | 4/2013 | Kotler et al. |
| 2013/0173064 | A1 | 7/2013 | Fadell et al. |
| 2013/0253709 | A1 | 9/2013 | Renggli et al. |
| 2013/0261799 | A1 | 10/2013 | Kuhlmann et al. |
| 2013/0262040 | A1 | 10/2013 | Buckley |
| 2013/0318217 | A1* | 11/2013 | Imes ............... F24F 11/006 709/221 |
| 2014/0006314 | A1 | 1/2014 | Yu et al. |
| 2014/0019319 | A1 | 1/2014 | Derby et al. |
| 2014/0039692 | A1* | 2/2014 | Leen ............... F24F 11/006 700/278 |
| 2014/0074300 | A1 | 3/2014 | Shilts et al. |
| 2014/0107850 | A1 | 4/2014 | Curtis |
| 2014/0148706 | A1 | 5/2014 | Van Treeck et al. |
| 2014/0163746 | A1 | 6/2014 | Drew et al. |
| 2014/0207292 | A1 | 7/2014 | Ramagem et al. |
| 2014/0277762 | A1* | 9/2014 | Drew ............... F24F 11/0086 700/276 |
| 2014/0337107 | A1 | 11/2014 | Foster |
| 2015/0227522 | A1 | 8/2015 | O'Donnell et al. |
| 2015/0227846 | A1 | 8/2015 | Mercer et al. |
| 2015/0254246 | A1 | 9/2015 | Sheth et al. |
| 2015/0267935 | A1 | 9/2015 | Devenish et al. |
| 2015/0269664 | A1 | 9/2015 | Davidson |
| 2015/0300831 | A1 | 10/2015 | Sernicola |
| 2015/0301543 | A1* | 10/2015 | Janoso ............... G05F 1/66 700/291 |
| 2015/0310019 | A1 | 10/2015 | Royer et al. |
| 2015/0310463 | A1 | 10/2015 | Turfboer et al. |
| 2015/0310465 | A1 | 10/2015 | Chan et al. |
| 2015/0319119 | A1 | 11/2015 | Ryu et al. |
| 2015/0324819 | A1 | 11/2015 | Lin et al. |
| 2015/0326679 | A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May, 19, 2008, 15 pages, available at http://web.archive.orgi/web/20080519220643/bie.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknovvn, "More than just a thermostat.," http://www.ecobee.com/, 4 pages, Jul. 16, 2013.
Author Unknovvn, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection via an X-Band Experimental Set-Up," Progress in Electromagnetics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

(56) References Cited

OTHER PUBLICATIONS

Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date 4/1812015, available at http://notamystery.com/2015/04/18/not_worth_the_papeUts_printed_on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.
Laskey, Alex, et al., "OPOWER," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatsoft.org, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting-Calculate and Categorize your spending, https://www.mint.com/how-it-works/budgeting/,?, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, lss. 5, pp. 1-19, Oct. 2007.
Wikipedia, "Akaike information criterion," 6 pages, Aug. 17, 2012.
Wikipedia, "Mixture model," 10 pages, Oct. 7, 2012.

* cited by examiner

NOTIFICATION TECHNIQUES FOR REDUCING ENERGY USAGE

CROSS-REFERENCE TO RELATED APPLICATIONS

The present application claims priority of U.S. Provisional Patent Application Ser. No. 62/116,242, filed on Feb. 13, 2015, the content of which is incorporated herein by reference in its entirety.

TECHNICAL FIELD

The present disclosure relates generally to energy usage, and more particularly, to notifications regarding optimizing energy usage for weather events.

BACKGROUND

Energy providers such as utility companies typically manage distribution of electricity or power for various sectors (or regions) of a power grid, while consumers (e.g., commercial, industrial, residential consumers, etc.) receive electricity directly or indirectly from such energy providers over the power grid. Currently, there is an ever growing motivation to reduce energy consumption for both energy providers and consumers. For example, reducing energy consumption can reduce costs, operating expenses, environmental impact, preserve resources, and the like.

Moreover, energy consumption is often driven, in large part, by heating and cooling demands. Accordingly, some energy providers attempt to distribute energy saving tips to their consumers to help reduce energy consumption (e.g., by adjusting thermostat temperatures, etc.). However, some approaches to distribute energy saving information are often ineffective. For example, the energy saving information may not provide relevant information or even target receptive consumers.

BRIEF DESCRIPTION OF THE DRAWINGS

The embodiments herein may be better understood by referring to the following description in conjunction with the accompanying drawings in which like reference numerals indicate the same or functionally similar elements. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

According to one or more embodiments of the disclosure, the notification techniques disclosed herein include detecting a weather event for a location of at least one consumer, determining, based on the weather event, at least one modified behavior (e.g., consumer behavior) to reduce energy usage for the at least one consumer, and providing a notification to the at least one consumer regarding the at least one modified behavior for the weather event.

By way of example, in one or more embodiments of this disclosure, a notification system detects a weather event (e.g., a change in temperature over a period of time, unseasonable weather, etc.) for a location associated with one or more consumers. Based on the weather event, the notification system can determine a modified behavior to reduce energy usage for the one or more consumers. For example, if the weather event is an unseasonably cool weather pattern (e.g., when the predicted outside temperature falls below historic temperatures), the notification system may identify certain modified behaviors (e.g., opening windows, etc.) that can maintain a comfortable indoor temperature while also reducing energy usage. The notification system further provides a notification (e.g., text, email, etc.) to the consumer regarding the certain modified behaviors for the weather event.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the term "user" or "consumer" shall be considered to mean a user and/or consumer of an electronic device(s). Actions performed by a user and/or consumer in the context of computer software, applications, and the like shall be considered to be actions taken by the electronic device(s) based on receiving commands from other devices to perform certain steps, or the user/consumer providing input commands to cause the electronic device to perform certain steps, as discussed herein. In some instances a user and/or consumer can refer to a user account and/or a user profile associated with a particular electronic device.

Figure 1:
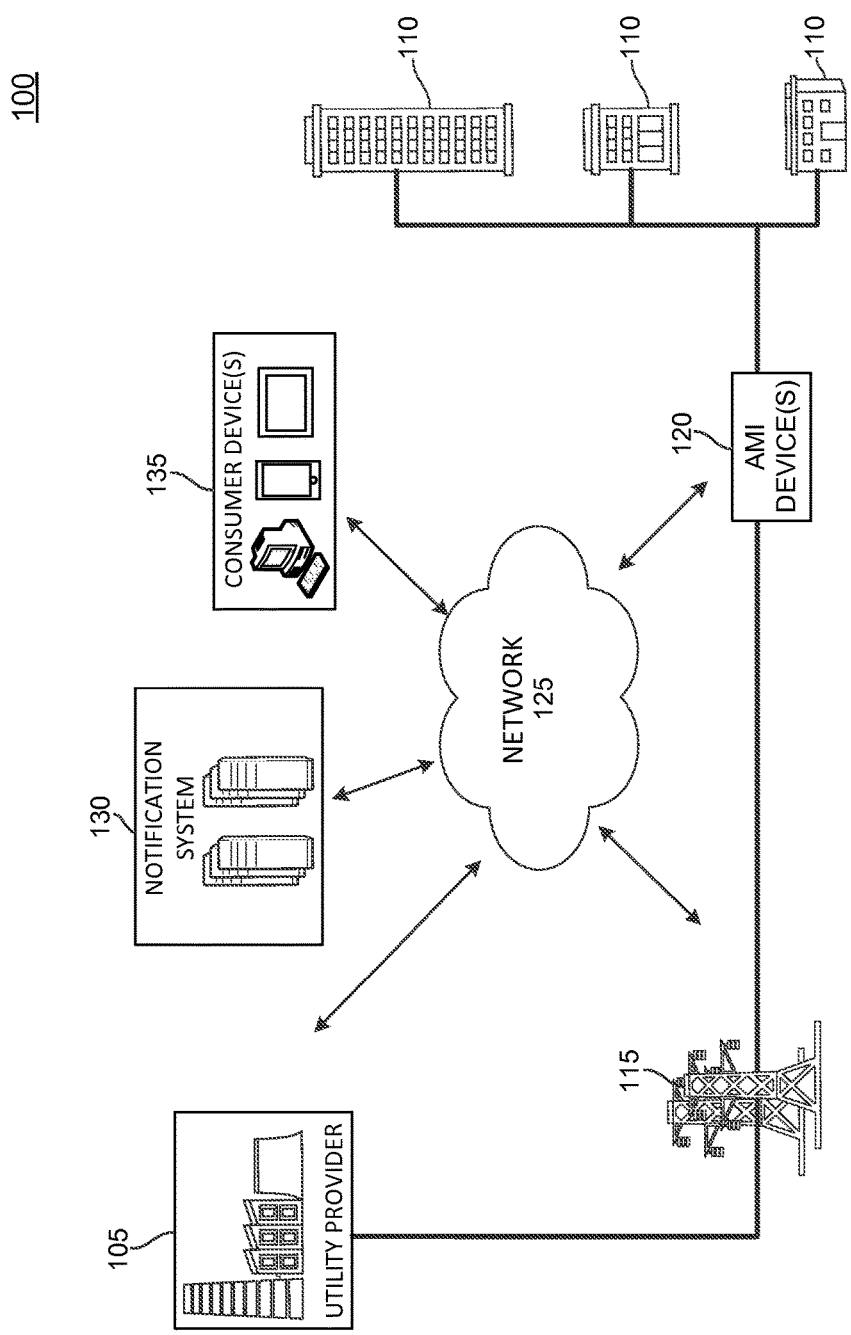
FIG. 1 is a schematic diagram of an example electrical infrastructure.

FIG. 1 is a schematic diagram of an example electrical infrastructure 100, illustratively including a utility provider 105 and one or more consumer buildings 110 (e.g., commercial, industrial, residential buildings, etc.) interconnected by a power infrastructure or a power grid 115. As shown, power grid 115 includes one or more Advanced Metering Infrastructure (AMI) device(s) 120. These AMI devices 120 may be spatially distributed over power grid 115 to monitor physical or environmental conditions of electrical infrastructure 100 at different locations, including, for example, energy/power consumption, resource consumption (e.g., water/gas/etc.), temperatures, pressure, vibration, sound, radiation, motion, pollutants, and the like.

Infrastructure 100 also includes a communication network 125 (e.g., the Internet) that interconnects and transports data between network devices/nodes over respective communication links. As shown, the network devices/nodes include utility provider 105, devices comprising power grid 115, AMI devices 120, a notification system 130, and consumer device(s) 135. Consumer device(s) 135 represent any type of electronic consumer device capable of receiving and displaying notifications (e.g., energy savings, energy consumption, etc.). For example, consumer device(s) 135 can include a mobile phone, laptop, computer system, tablet, and the like, as is appreciated by those skilled in the art.

Network 125 is representative of various types of networks, ranging from local area networks (LANs) to wide area networks (WANs). LANs, for example, typically connect the nodes over dedicated private communications links located in the same general physical location, such as a building or campus. WANs typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. Those skilled in the art will understand that any number of network nodes, devices, communication links, etc. may be used in network 125, and further the view shown herein is for simplicity.

Notification system 130 operatively collects and aggregates information regarding consumers, demographics, and weather events according to the notification techniques to reduce energy usage. As discussed in greater detail below, notification system 130 uses combinations of such information to detect one or more weather events for a location of a consumer, determine modified behavior to reduce energy usage (e.g., at a consumer's residence, etc.), and provide a notification to the consumer (e.g., consumer device 135) regarding the modified behavior for the weather event.

Notably, the consumer information can include, for example, indications of responsiveness to prior notifications regarding energy savings, solicitations for new notifications regarding energy savings, user profile information, and historical energy usage such as power usage data for the consumer (e.g., regarding an associated consumer buildings 110). Further, the historical energy usage and/or the power usage data may include, for example, periodic (e.g., hourly, daily, monthly, etc.) power readings corresponding to the consumer buildings 110. The information regarding demographics can include, for example, property costs, size (e.g., sq. ft.) for buildings, socioeconomic information for consumers, property ownership status, and the like. Information regarding weather events information can include, for example, historical, current, and/or predicted temperatures, precipitation, wind speeds, barometric pressure, humidity levels, cloud cover, and other weather related information.

Operatively, notification system 130 receives the information regarding consumers, demographics, and weather events from any of the devices connected to network 125—e.g., AMI device 120, devices comprising power grid 115 (not shown), utility provider 105, consumer buildings 110 (e.g., devices within consumer buildings 110, etc.), and the like. In other embodiments, notification system 130 receives the information from third party agencies or services (e.g., third party data providers). In such other embodiments, the third party data provider may represent any service or combination of services (including on or more servers, clusters or data collection networks) that can collect, host and/or provide various types of information to/from notification system 130.

It is understood that infrastructure 100 illustrates one example of an environment in which aspects of this disclosure can be practiced; however, other configurations can be implemented without departing from the scope of the subject technology. For example, in other implementations, various numbers of network devices, consuming entities (e.g., businesses, residences, or industrial facilities), resource providers, and the like may be included (or excluded) as appropriate.

Figure 2:
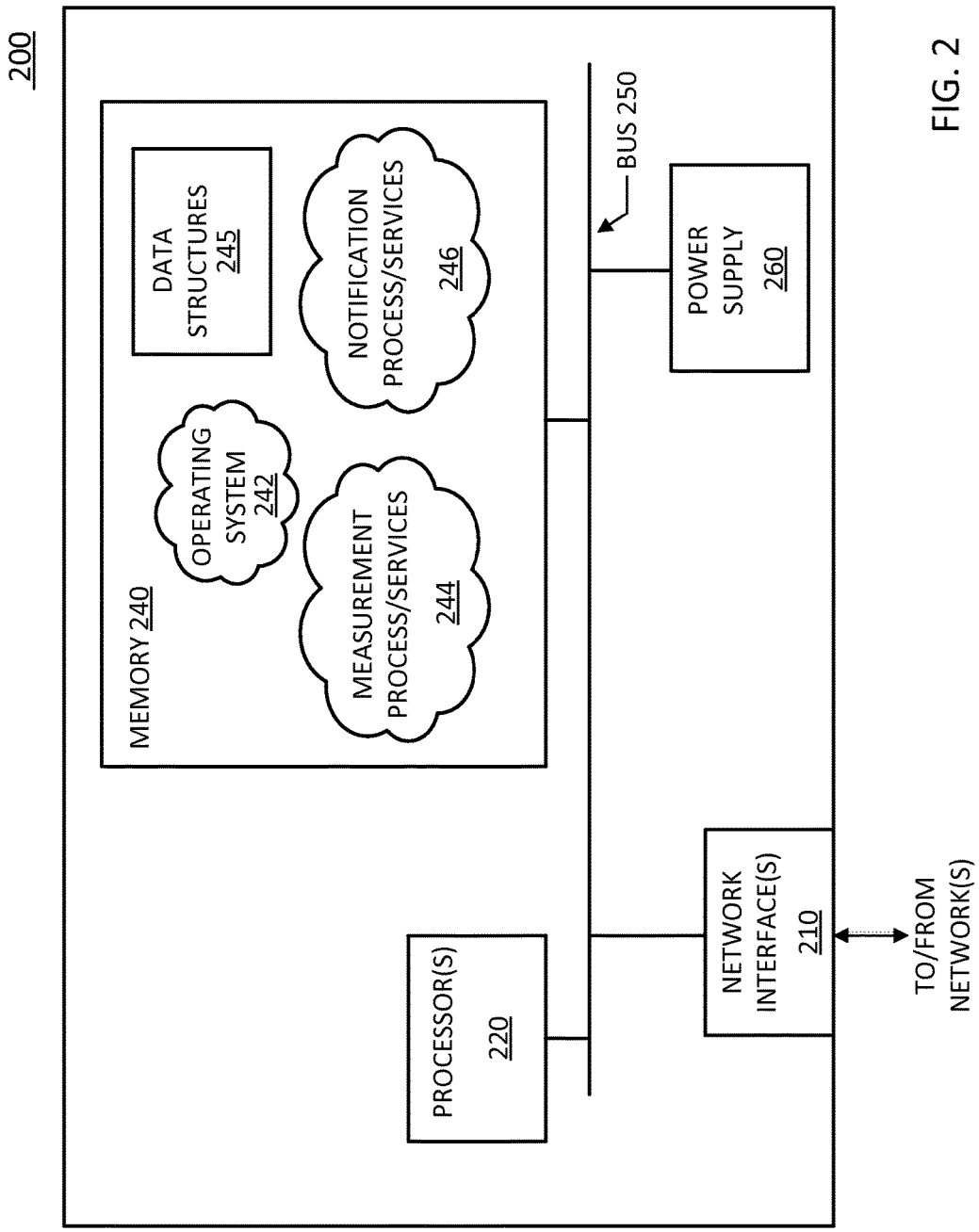
FIG. 2 is a schematic diagram of an example device/node.

FIG. 2 is a schematic block diagram of an example device 200 that may be used with one or more embodiments described herein, e.g., as part of notification system 130 and/or as one of the devices shown in FIG. 1, above. Device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 contain the mechanical, electrical, and signaling circuitry for communicating data (e.g., information regarding consumers, demographics, weather events, notifications, etc.) over communication network 125. In this fashion, network interfaces 210 may be configured to transmit and/or receive data using a variety of different communication protocols. Also, while network interfaces 210 is shown separately from power supply 260, for PLC, network interfaces 210 may communicate through the power supply 260 (or may be an integral component of power supply 260). In some specific configurations the PLC signal may be coupled to the power line feeding into the power supply.

Memory 240 comprises a plurality of storage locations addressable by the processor 220 and network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a measurement process/services 244, and a notification process/services 246 (collectively referred to as "notification techniques"), as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Illustratively, the techniques described herein may be performed by hardware, software, and/or firmware, such as in accordance with measurement process 244 and/or notification process 246, each of which may contain computer executable instructions executed by the processor 220 (or independent processor of network interfaces 210) to perform functions relating to the techniques described herein.

As discussed above, there is an ever growing motivation to reduce energy consumption for both energy providers and consumers. Further, a large portion of energy consumption is often attributed to heating and cooling demands. Despite efforts to date, some approaches to distribute energy savings information and incentivize reductions in energy consumption may not provide relevant information and/or may not target receptive consumers.

Accordingly, the techniques disclosed herein provide an energy efficiency program that provides relevant notifications to a target audience (e.g., one or more consumers) regarding energy savings and incentives to reduce energy consumption. For example, as discussed in greater detail below, the notifications can particularly indicate when a weather event occurs (e.g., past, current, predicted weather events) for a target audience and provide such target audience with notifications regarding energy savings. This energy savings information can include, for example, energy savings tips (e.g., modified behaviors such as turning off heat, A/C, opening windows, etc.), values for the energy savings during the weather event, comparisons to other similar residences, and the like. Generally, as discussed herein, modified behaviors mitigate wasteful energy consumption. For example, the modified behaviors represent one or more consumer actions that reduce energy usage (e.g., as compared to prior energy usage). The modified behaviors are selected, in part, based on the weather event. For example, during a weather event indicative of a hot spell, some modified behaviors include opening windows, turning on fans, closing blinds, and the like. In contrast, for a weather event indicative of a cold spell, the modified consumer behavior can include closing windows, opening blinds, and the like. As discussed above, the notifications regarding energy savings can include energy savings tips, which may include one or more of these modified behaviors.

Figure 3:
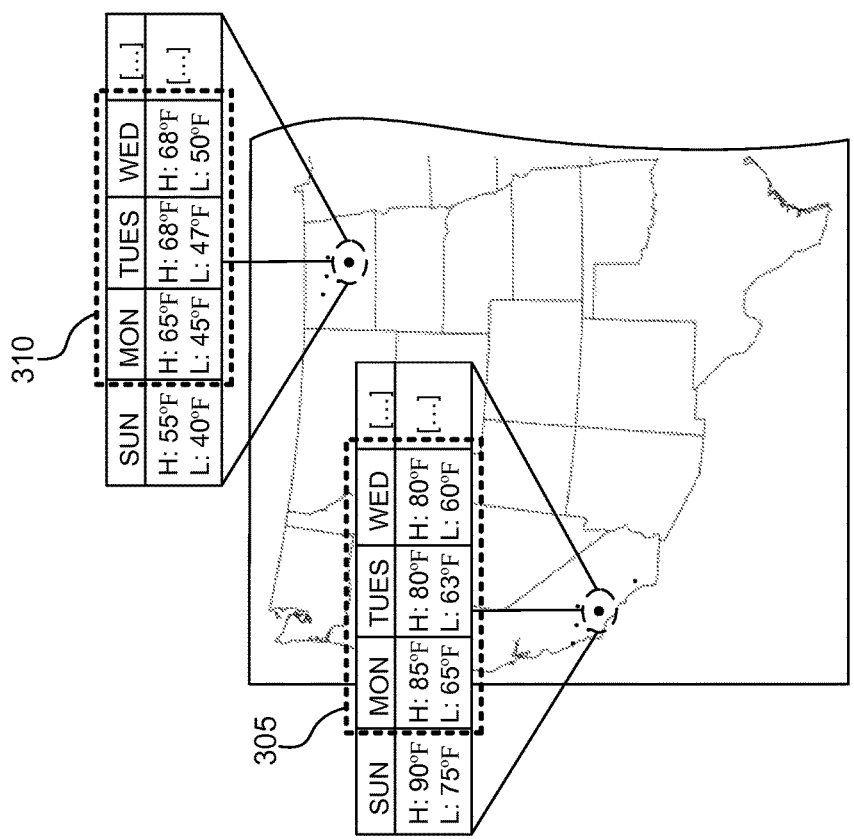
FIG. 3 is a schematic diagram of example weather events for respective geographic locations.

FIG. 3 is a schematic diagram 300 showing two weather events—namely, weather event 305 and weather event 310—at respective geographic locations (e.g., locations in the United States). As discussed herein, weather events can include, for example, predicted weather, current weather, past weather, and/or a combination of weather conditions. Here, weather event 305 particularly represents a cold spell weather event when daily low temperatures for a period of time (here 3 days) are below a threshold temperature ($T_{threshold}$). In contrast, weather event 310 represents a heat wave weather event when daily high temperatures for the period of time are above $T_{threshold}$. Weather event 305 and weather event 310 are provided for purposes of illustration and simplicity, not limitation, and it is appreciated that $T_{threshold}$ may include more than one temperature (e.g., a high threshold temperature, a low threshold temperature, etc.), temperatures ranges, and the like. Further, cold spell weather events and heat wave weather events may be also consider additional weather-related phenomenon such as precipitation, cloud cover, and the like, for various time periods (e.g., minutes, hours, days, months, etc.). Notably, in some embodiments, the cold spell and/or the heat wave are determined based a comparison between predicted (or current) temperatures and historic temperatures (e.g., from a prior day, week, month, year, etc.).

Further, $T_{threshold}$ may represent a preferred temperature and/or a set-point temperature inside a corresponding building/residence, and may be selected on various factors—for example, $T_{threshold}$ may be selected based on measured or preferred thermostat set-point temperature(s) in respective buildings/residences (e.g., 65° F.), analysis of electrical load curves as compared to daily temperatures/temperature ranges for respective buildings/residences, and the like.

Operatively, the notification techniques disclosed herein can detect a weather event when high or low temperatures for a period of time are above or below the threshold (e.g., $T_{threshold}$). Referring again to FIG. 1, notification system 130 may receive data from various network nodes in infrastructure 100 and/or receive data from third party sources (discussed above) regarding weather for geographical location (e.g., temperature, precipitation, wind speed, sunlight, cloud cover, etc.). Once detected, notification system 130 may determine one or more modified behaviors to impact energy usage (e.g., reduce energy usage) and transmit notifications regarding the modified behavior (e.g., turning off cooling/heating sources, opening windows, etc.) to consumer for the weather event.

Figure 4:
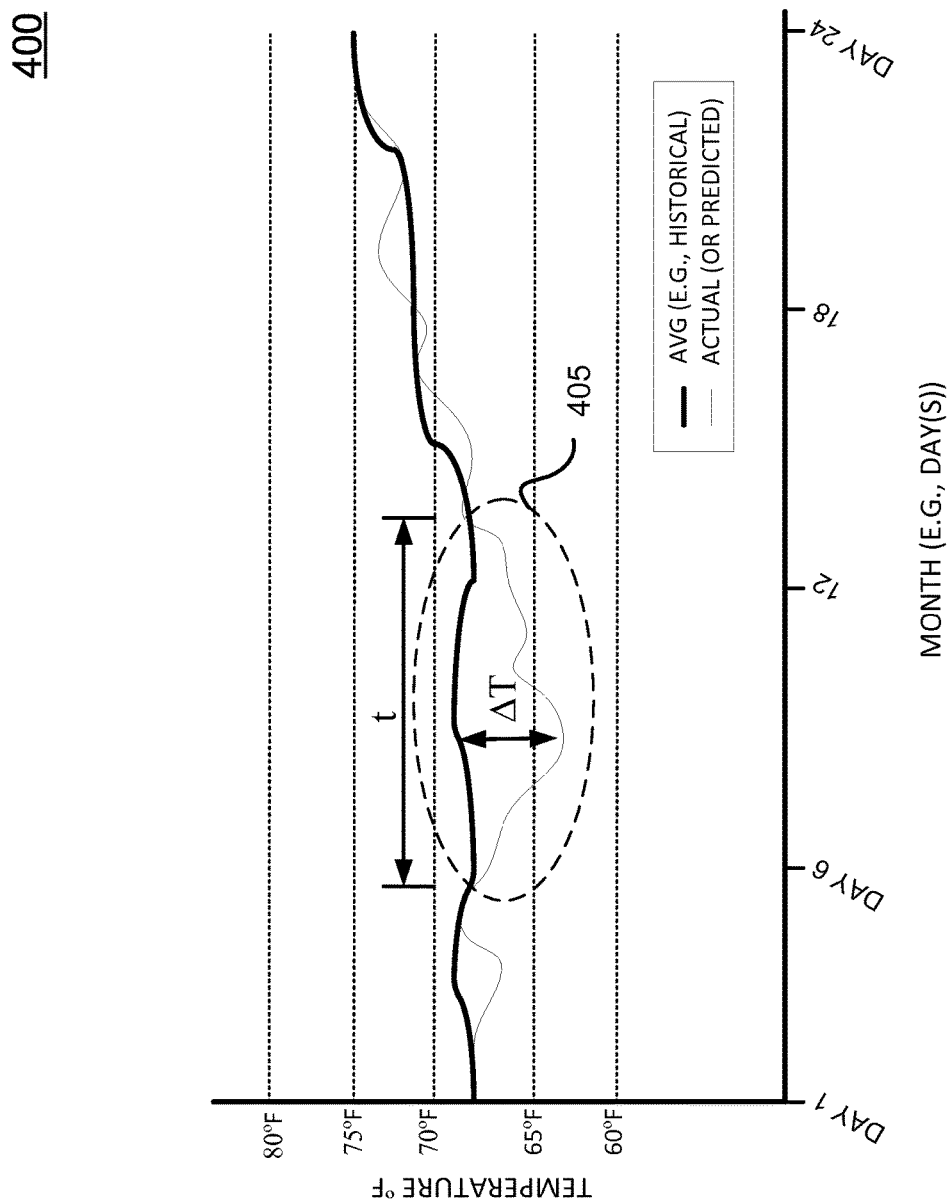
FIG. 4 is a graphical representation of weather event for a geographical location.

FIG. 4 is a graphical representation of a weather event 405 for a geographical location, as shown in a graph 400. Graph 400 illustrates average temperatures such as average historical temperatures, and actual (and/or predicted) temperatures for the geographical location over a time period (t). Large deviations, changes, or deltas between the average temperature and the actual temperature (represented by ΔT) over the time period (t) are measured and may be compared against a threshold change or a threshold delta ($Δ_{threshold}$) to detect weather event 405. For example, weather event 405 may be detected when ΔT/t is greater than $Δ_{threshold}$.

Notably, the changes or deviations of the actual and/or predicted temperature shown in graph 400 reference a historic average temperature (e.g., annual historical average temperatures). However, it is readily appreciated that the changes or deviations in the temperature may reference other baseline temperatures, ranges, and the like (e.g., a prior day, week, month, etc.). Moreover, graph 400, illustrates detecting weather event 405 based on a single temperature deviation (ΔT/t) over the time period for purposes of simplicity and discussion herein, however, it is appreciated that a weather event may be detected based on a combination of conditions. For example, weather event 405 may be detected based on multiple time periods having temperature deviations above/below the threshold (e.g., a first time period having a temperature deviation above a threshold combined with a second time period having a temperature deviation below the threshold). Similarly, weather event 405 may be detected based on multiple temperature threshold conditions—e.g., a first time period having a temperature deviation above/below a first threshold and a second time period having a temperature deviation below/above a second threshold. Further, as discussed above with reference to FIG. 3, weather event 405 may be detected based on a comparison of a temperature alone (not a temperature deviation) to one or more thresholds, as is appreciated by those skilled in the art.

Figure 5:
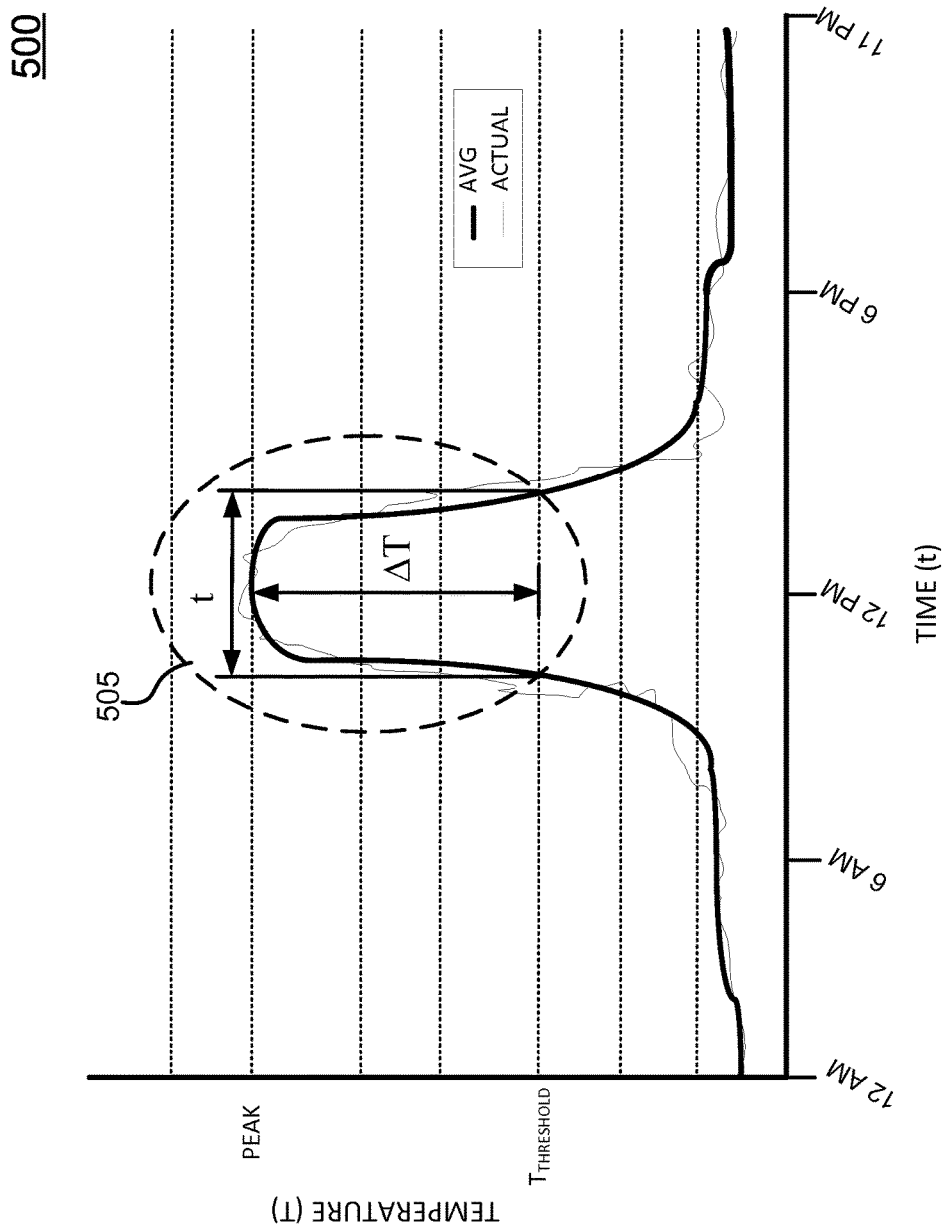
FIG. 5 is a graphical representation of a weather event for a geographical location according to another embodiment of this disclosure.

FIG. 5 is another graphical representation of a weather event 505 for a geographical location shown in a graph 500. Graph 500 illustrates a combination of thresholds for detecting a weather event 505. Here, weather event 505 is detected, in part, based on the temperature threshold ($T_{threshold}$) and the threshold delta $Δ_{threshold}$. As discussed above, $T_{threshold}$ may represent a preferred temperature inside a corresponding building/residence, and $Δ_{threshold}$ may represent a threshold change in temperature over a period of time.

Weather event 505 particularly includes a ΔT measured over a more granular period of time (t) when the temperature is above $T_{threshold}$. As shown, graph 500 provides temperatures for a 24-hour period, including an actual temperature as well as an average temperature. In addition, graph 500 provides a $T_{threshold}$ and a peak temperature. The notification techniques described herein detect weather event 505 when the change in temperature (ΔT) above the temperature threshold ($T_{threshold}$) over a period of time (t) is greater than a threshold change in temperature over the time period ($\Delta_{threshold}$). Put differently, weather event 505 is detected when $(\Delta T > T_{threshold})/t) > \Delta_{threshold}$.

In this fashion, weather event 505 accounts for sudden or abrupt temperature spikes that may not otherwise be appreciated by broader daily high/low temperatures (c.f., FIG. 3). Moreover, using the above described comparison, the notification techniques may determine that weather event 505 occur over a only small portion of a day while a larger portion of the day remains at a comfortable temperature (e.g., below $T_{threshold}$). Thus, the notification techniques may determine the detected weather event may not impact an overall temperature inside a building over the day. Further, to the extent that weather event 505 potentially affects or otherwise impacts the temperature inside the building, the notification techniques may determine the consumer for the building will not be present (e.g., the consumer may be at a different location, outside of the building, at work, etc.). For example, the notification techniques may determine a consumer presence or lack thereof within the building based on energy usage and/or load curves. However, as discussed above, the consumer may not appreciate that weather event 505 will not significantly impact the overall temperature inside the building and/or that any potential impact to the overall temperature occurs while the consumer is away from the building. As a result, the consumer may engage in wasteful energy consumption such as turning on heating/cooling sources for the day (or the time period of weather event 505). Alternatively (or in addition), if the consumer is likely to be present in the building during the weather event that consumer may be in a position to engage in mitigating/modified behavior at the time of weather event 505. Accordingly, such consumers may be identified as part of a target audience (discussed in greater detail below).

With specific reference to graph 500, the notification techniques may detect weather event 505 and determine weather event 505 is a temperature "spike". In this example, weather event 505 only causes a temperatures above the threshold over a short period of the day (e.g., when the consumer is not present in the building), while a larger part of the day remains below the temperature threshold. Accordingly, a notification may be sent to the consumer that identifies weather event 505 and suggests that the consumer open windows for the building, which may provide sufficient airflow and mitigate against any potential temperature increase inside the building caused by the temperature spike.

In this fashion, the notification techniques disclosed herein detect weather events, such as weather event 505, and provide notifications to consumers regarding modified behavior(s) (e.g., turning off heating/cooling sources, opening/closing windows, opening/closing blinds, etc.), which may result in comfortable indoor temperatures (e.g., indoor temperatures not significantly impacted by weather event 505) while reducing wasteful energy consumption.

While weather event 505 is defined by a ΔT is above a $T_{threshold}$ for the period of time (t) (e.g., $(\Delta T > T_{threshold})/t$), and determining when a resultant value is above $\Delta_{threshold}$, it is appreciated that weather events may be defined by changes below or less than the $T_{threshold}$ for the period of time (t) (e.g., $(\Delta T < T_{threshold})/t$), and further, determining when such resultant value is below $\Delta_{threshold}$. Further, it is appreciated that weather event 505 may be determined using historical temperatures, predicted temperatures, and the like.

Figure 6:
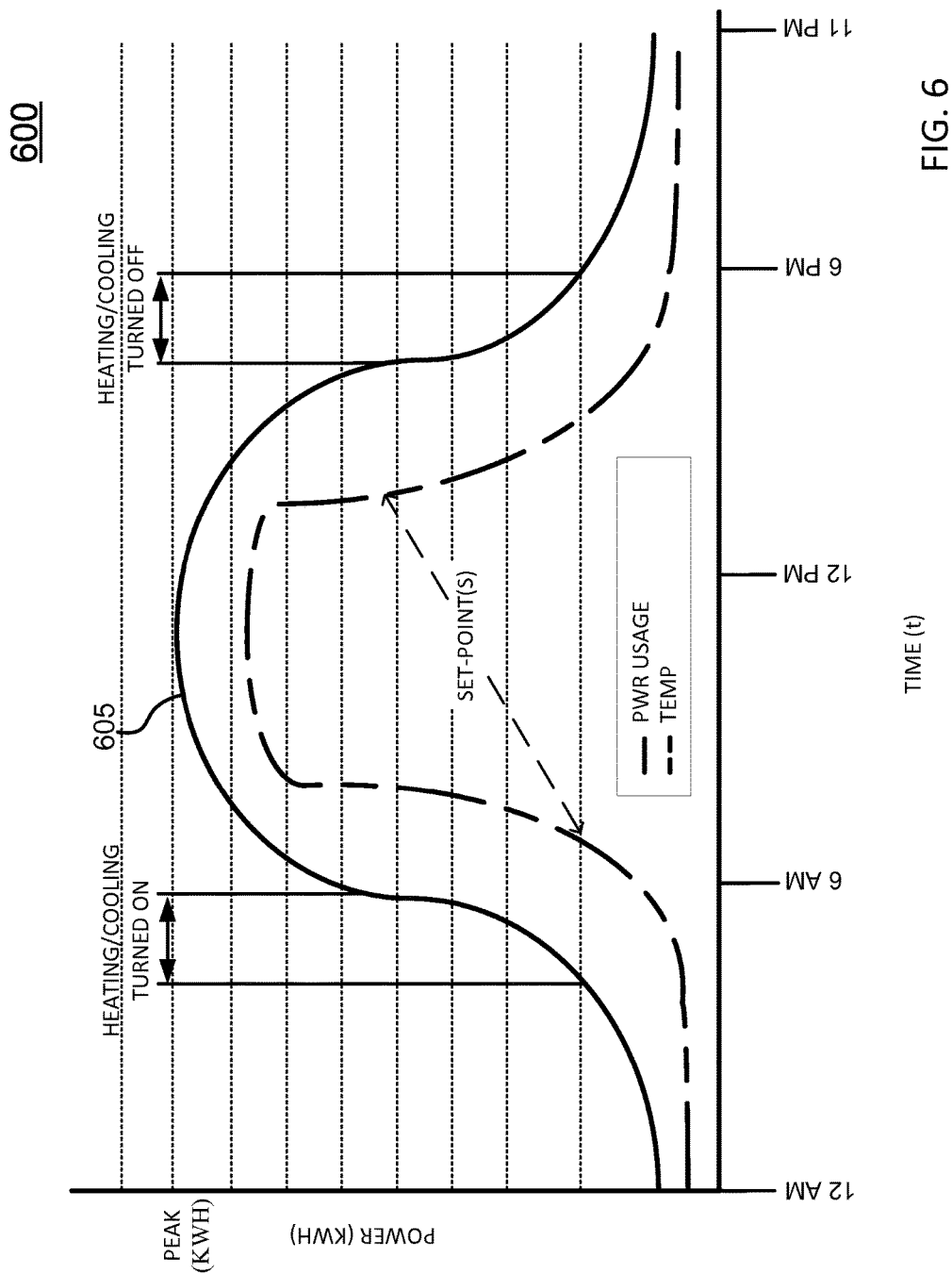
FIG. 6 is a graphical representation of an example power load curve 605 for one or more consumers.

FIG. 6 is a graphical representation of an example power load curve 605 for a consumer building, shown in graph 600. Power load curve 605 illustratively includes a time-varying measurement of resource consumption (e.g., power consumption) for the consumer building over a specific time interval (e.g., a 24-hour day). Notably, although graph 600 provides power load curve 605 for power consumption, such power consumption is merely illustrative and may represent other types of consumption patterns of resources, such as water, gas, and the like, and further the specific time interval is likewise merely illustrative and can include any time-interval (e.g., monthly, weekly, etc.), as is appreciated by those skilled in the art.

As shown, power load curve 605 is largely influenced by heating and or cooling sources. For example, two time intervals—i.e., "heating/cooling turned on" and "heating/cooling turned off"—demark large increases/decreases in power consumption. Further, a temperature curve (shown in dash-lines) is also provided as a reference to demonstrate a correlation between a rising/falling temperatures, set-point(s), and the large increase/decrease in power consumption. The set-points, as illustrated, include two different temperatures, but may also define a temperature range, which can be employed by heating/cooling sources to avoid hysteresis, as is appreciated by those skilled in the art. Moreover, the notification techniques disclosed herein may determine such set-points and assign one or more of the set-points as a $T_{threshold}$, as discussed above. For example, the notification techniques may receive the set-points from smart thermostats deployed within a consumer building. In other embodiments, the notification techniques may determine or infer the set-point(s) using regression analysis of power load curves, historical temperatures, and the like.

Power load curve 605 may represent typical power consumption for the consumer building during, for example, a "warm" day when temperatures inside the building exceed the set-point temperature for a cooling source (e.g., A/C unit, central air, etc.), causing the cooling source to turn on/off. As shown, power load curve 605 generally increases when the cooling unit turns on (e.g., when the temperature exceeds a corresponding set-point temperature), and generally decreases when the temperature decreases, e.g., when the temperature is below the corresponding set-point temperature. Further, it is also appreciated that similar power curves may represent a "cool" day when temperatures are below a set-point temperature for a heating source (e.g., heating units, etc.), causing the heating source to turn on/off.

Power load curve 605 may also be used to determine, in part, energy efficiency coefficients (e.g., heating and/or cooling). For example, the rates of change and slopes of power load curves may indicate that a particular residence is well insulated (or not very well insulated), which translates into higher or lower energy efficiency coefficients.

As discussed above, consumer information such as power usage data (e.g., power load curves, etc.) may be collected and aggregated for various consumers/consumer buildings and used to identify a target audience for energy saving notifications. For example, historical records of power usage data can used to identify consumers that consume "large" amounts of energy (e.g., an absolute amount of energy, a comparison to other consumers, etc.) on days when the outside temperatures are above/below a threshold temperature. As another example, the target audience may include power usage outliers that consume large amounts of energy for a particular aggregation level (e.g., a building, neighborhood, town, county, state, etc.). Further, the target audience may include those consumers associated with a particular energy efficiency coefficient—e.g., target consumers with low energy efficiencies.

Preferably, the target audience is identified based on power usage data in combination with other consumer information and/or demographic information. For example, consumer information such as indications of prior responsiveness, solicitations for new notifications, and user profile information may be used to include/exclude consumers that consume large amount of energy (e.g., on days when the outside temperatures are above/below a threshold temperature) Additionally, demographic information, discussed above, may also help identify an appropriate target audience. For example, the power usage data may identify consumers that consume large amounts of energy (e.g., energy usage more than a specified amount, consumers in a top percentage of energy usage relative to neighbors/similar users, etc.), and the demographic information may further filter those consumers based on an amount of potential energy savings for the household size—e.g., consumers associated with small properties may be more likely to benefit from energy savings notifications because the small properties may not absorb as much heat on a hot day as a large property. In some embodiments, some consumers included in a target audience may be excluded based on respective demographic information—e.g., consumers that do not pay for utilities because they rent properties (no ownership). Further, in other embodiments, the power usage data can be organized according to consumers of a similar socio-economic status to identify outliers appropriate as a target audience. It is appreciated that the above examples are provided for purposes of illustration, not limitation, and further, various other combinations of consumer information (including power usage data), demographic information, and weather event information may be used by the notification techniques to identify a target audience. Notably, the consumer information and/or demographic information can be collected, stored, and/or retrieved by any number of devices shown in infrastructure 100 (FIG. 1). For example, AMI devices 120, a notification system 130, and consumer device(s) 135 may individually and/or collectively store such consumer information and/or demographic information.

With regard to notifications, FIGS. 7A-I provide examples of views of client device 135 displaying notifications regarding energy savings and reductions for energy consumption. As discussed herein, the notification techniques may be used to incentive certain consumer behavior and/or modify certain consumer behavior. For example, consumers may be notified of modified behavior (e.g., consumer actions such as opening windows, closing windows, turning off heating/cooling sources, etc.) for a weather event. These notifications may further relieve demand (e.g., peak demand) for electrical systems and avoid system emergencies.

In some embodiments, the efficacy of the notification techniques can vary greatly, depending on relevance to a target audience, as discussed above. Thus, in some implementations, highly targeted customer notifications are preferential to generalized notifications. Further, in some embodiments, as discussed below, the notifications can include comparisons for the target audience to other consumers, historical comparisons, and the like, to incentivize reductions in energy consumption for a weather event.

Collectively, FIGS. 7A-I illustrate notifications regarding a weather event, including one or more tips to conserve energy, consumer's past energy consumption or savings during a similar weather event and/or consumer's energy consumption or savings during the weather event. The notifications can be provided, for example, one or more days before, during and/or one or more days after the weather event. The notifications can help the consumer to save money on energy bills, save energy and/or improve customer sentiment towards the energy company. Further these notifications may be provided by a notification system (e.g., notification system 130), and presented to consumers via one or more consumer devices (e.g., consumer devices 135).

Figure 7A:
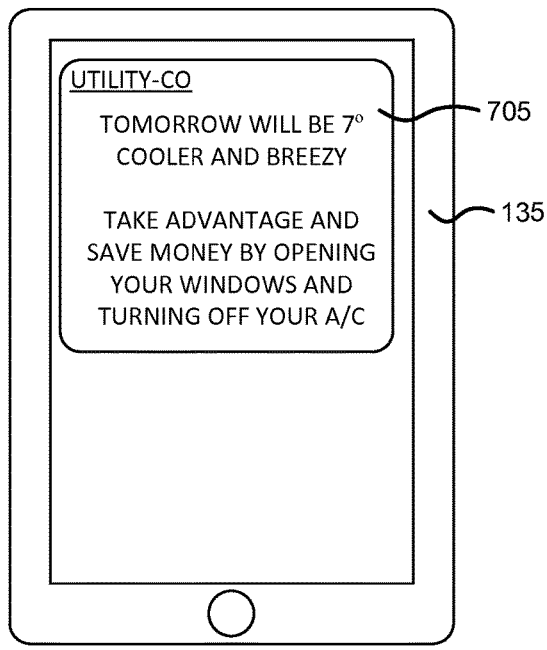
FIGS. 7A-7I are example views of a client device displaying one or more notifications regarding energy savings.

FIG. 7A illustrates a notification 705 that may be provided by the notification system to a customer when conditions for a particular weather event (e.g., a "cooling off" weather event) are met. In particular, the notification system may determine that the difference between the temperature at the location of the customer today (or average temperature the past N days) and the predicted temperature at the location of the customer tomorrow exceeds a threshold temperature delta (e.g., 5 degrees Fahrenheit). Based on the detected whether event, the notification system may determine at least one modified behavior designed to reduce energy usage for the customer, generate a notification for the customer, and provide the notification to the customer. As seen in FIG. 7A, the notification 705 provides information regarding an upcoming weather event (e.g., predicted temperature difference tomorrow) and information regarding the selected modified behavior—here, "opening your windows and turning off you A/C"—for reducing energy usage and/or increasing energy savings.

Figure 7B:
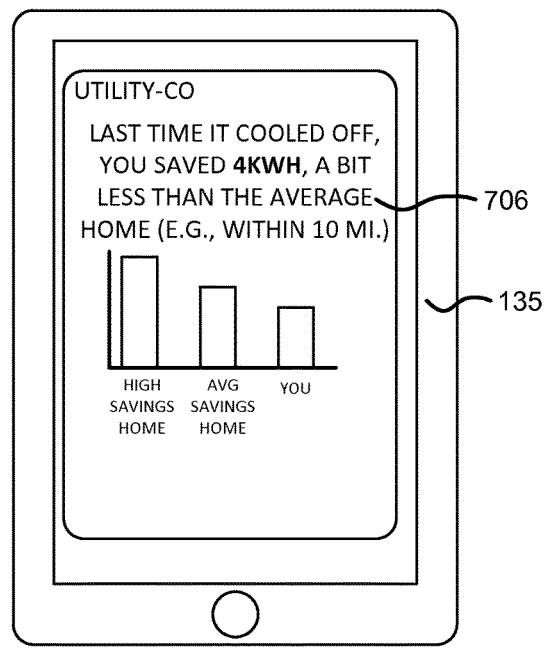

FIG. 7B illustrates a notification 706, which provides information regarding energy savings for a past weather event, including a comparison of energy savings to other buildings/homes in the area (e.g., within 10 miles). For example, as discussed above, the notification techniques may be employed by notification system 130, which may store energy usage data for multiple consumers. The energy usage for multiple consumers may be used to determine an "average" or baseline energy usage for similar consumers (e.g., organized according to a location (e.g., neighboring buildings), a demographic, a socio-economic status, the like). The energy usage for a target audience may be compared against such baseline energy usage to determine comparison information presented by notification 706. In this fashion, the notification techniques may provide the target audience with information regarding energy savings as compared to energy savings for "average homes" during a weather event.

Moreover, after notification 706 is provided to the target audience, the notification techniques may continue to monitor energy usage for the target audience during the weather event and determine if a level of responsiveness (e.g., a change in energy usage as compared to previous energy usage for the target audience). Such responsiveness may be further used to identify subsequent target audiences for additional notifications.

Figure 7C:
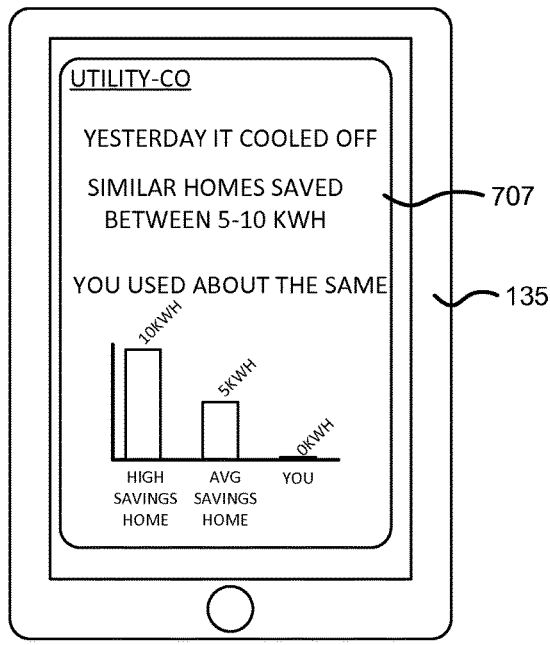

FIG. 7C illustrates a notification 707, which provides information regarding a prior weather event (e.g., yesterday, it cooled off) as well as energy savings of similar homes. As discussed above, the notification techniques may monitor energy usage for a target audience and/or other similar consumers during a weather event. The energy usage of consumers during a weather event may be used to determine a baseline energy usage. Further, the energy usage for the target audience may be compared against the baseline energy usage to determine an energy savings (if any), which is provided to the target audience by notification 707.

Figure 7D:
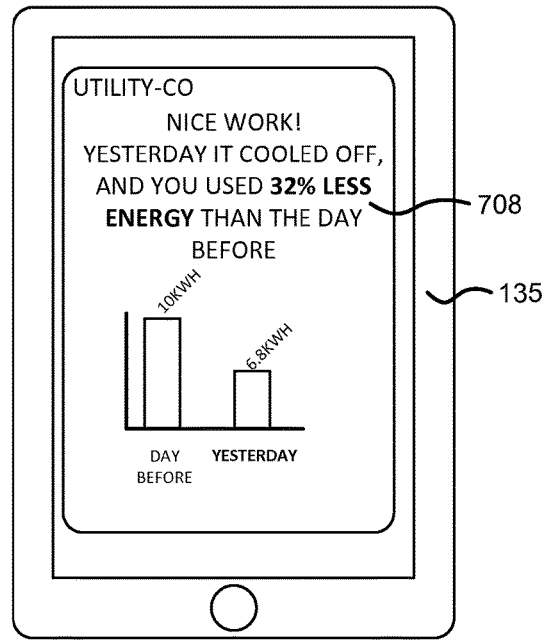

FIG. 7D illustrates a notification 708, which provides information regarding a past weather event as well as historical statistics for energy savings—here, a comparison between energy savings for "yesterday" and a "day before [yesterday]". As discussed above, the notification techniques may monitor and store energy usage information for the target audience. As shown in notification 708, the notification techniques particularly monitor energy usage for the target audience for a two day period—i.e., yesterday, and a day before yesterday—and provides the target audience with comparisons of energy usage for the same two day period.

Figure 7E:
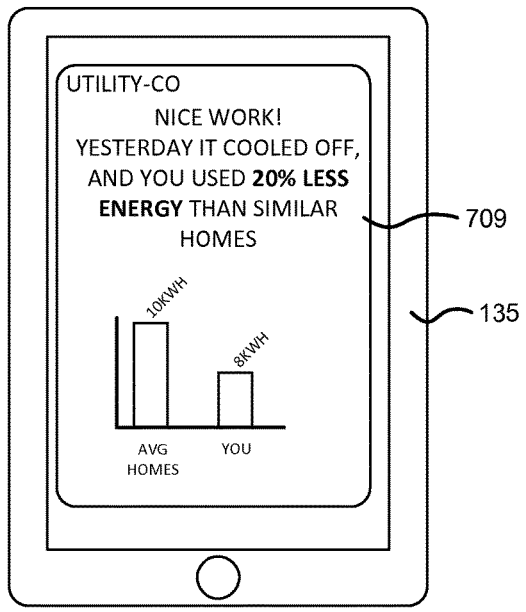

FIG. 7E illustrates a notification 709, which provides information regarding a past weather event and energy savings statistics as compared to average homes.

Figure 7F:
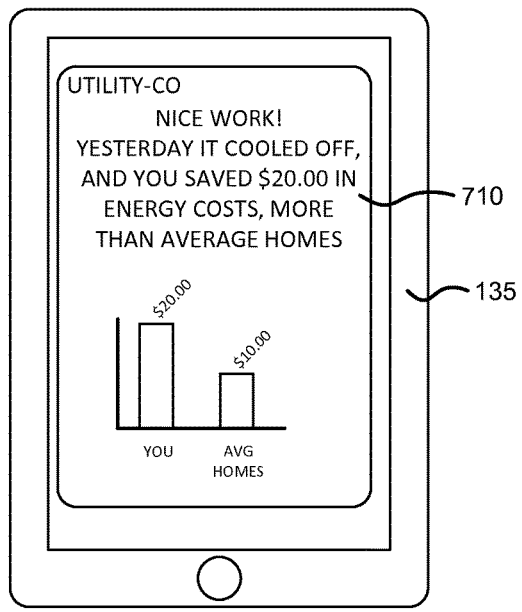

FIG. 7F illustrates a notification 710, which provides information regarding a past weather event and a financial amount of energy savings as compared to average homes. The notification techniques monitor and store energy usage for various consumers over various periods of time. Energy usage, as is appreciated by those skilled in the art, may be correlated to a financial dollar amount, determined by pricing models set by, for example, utility companies, power companies, and the like. The monitoring techniques may use the pricing model to determine that the energy usage for a particular consumer equates to a particular financial dollar amount. In the same fashion the monitoring techniques determine energy savings for a consumer as compared to a baseline, the monitoring techniques may further determine energy savings, represented as a dollar amount, for the particular consumer.

In some embodiments, the monitoring techniques determine a baseline energy cost, for example, based on customer usage (e.g., for a corresponding building/residence), based on a similar population (e.g., similar homes, neighborhoods, etc.), and/or based on heating/cooling coefficients, which are described in U.S. Pat. No. 8,660,813 and is incorporated herein by reference in its entirety.

The baseline energy cost based on customer usage may correspond to a customer's individual energy usage, which energy usage may be determined before the weather event (e.g., the hot days before a cooling off event), for similar weather events where notifications were not provided, and/or for days with similar weather conditions (e.g., other days with similar temperature, humidity, cloud cover, wind speed, etc.).

As is appreciated by those skilled in the art, the monitoring techniques may analyze energy usage data for various consumers for a specified area, demographic, and the like. In this fashion, the baseline energy cost based on an energy usage of a similar population can include energy usage data and/or weather/environmental data for buildings similar to that of the consumer (e.g., similar based on size, location, type (condo, apartment, single family), ownership status (renter/owner), number of rooms, usage levels, load curve archetype, etc.) and nearby (e.g., on the same street, same zip code/city, etc.). For example, the energy usage baseline can be determined based on a neighbors' energy usage during a weather event, including neighbors that did not receive any notifications for reducing energy usage. Alternatively, or in addition to the above, the energy usage baseline can be determined based on a neighbors' energy usage for days having a weather condition similar to the weather event The monitoring techniques identify an energy cost as a result of a difference between energy usage for a weather event and the baseline energy cost multiplied by the cost of energy. In some embodiments, such cost of energy may further account for energy cost rate structures (e.g., set by utility companies). For example, for each time period with a different cost, an energy cost may be determined and aggregated to yield a total energy cost over a weather event. It is appreciated actual rate structures may vary per consumer and be more complex and further calculations may be necessary to accurately determine the energy cost savings/expenditures for a weather event.

Figure 7G:
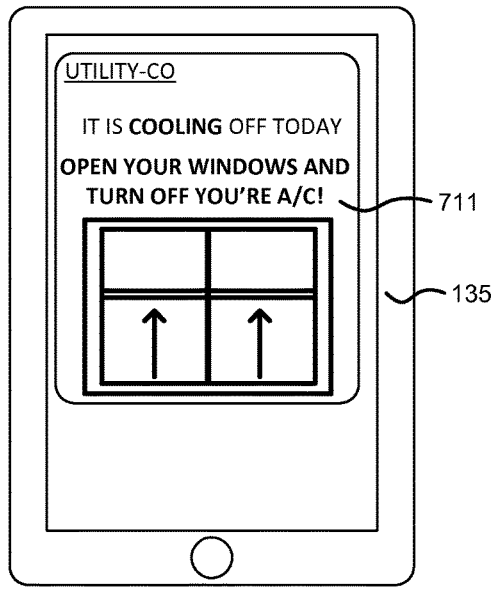
Figure 7H:
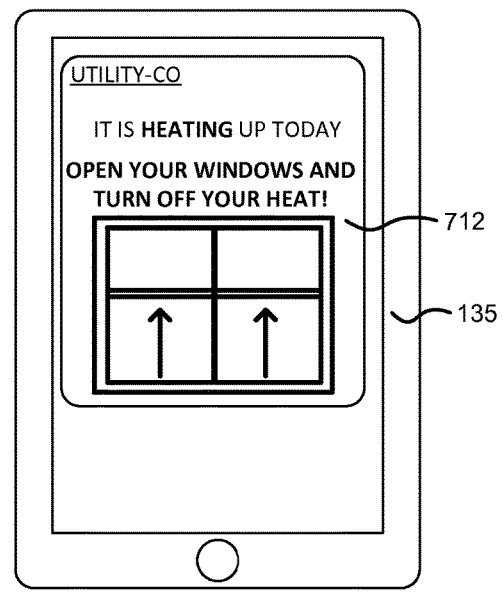

FIG. 7G illustrates a notification 711, which provides information regarding a weather event (e.g., a cooling off weather event) predicted for the upcoming day and an energy savings tip regarding modified behavior—namely, "open your windows and turn off you A/C"—to reduce energy consumption. In contrast, FIG. 7H illustrates a notification 711, which provides information regarding a different weather event (e.g., a heating up weather event) predicted for the upcoming day and an energy savings tip regarding modified behavior to reduce energy consumption.

Figure 7I:
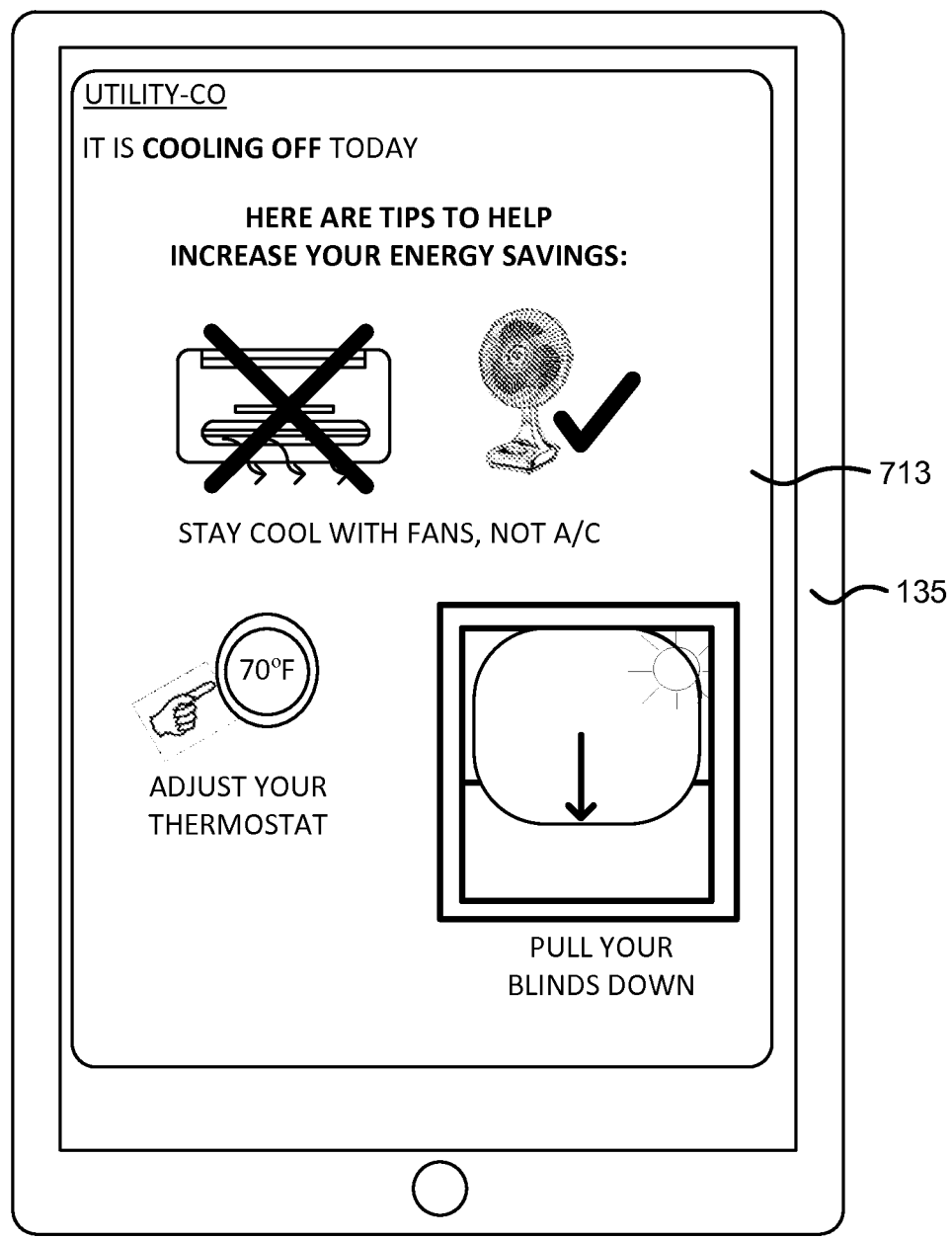

FIG. 7I illustrates a notification 713, which provides information regarding a weather event (e.g., a cooling off weather event) and a plurality of energy savings tips regarding modified behavior for reducing energy usage/consumption. For example, the tips include using fans, instead of a cooling source (e.g., A/C), adjusting a thermostat temperature (e.g., setting it higher for a cooling off event, etc.), as well as adjusting blinds for a window to keep the interior of the home cool during the day.

As described above, FIGS. 7A-7I illustrate examples of notifications regarding weather events, modified behavior, energy savings, comparisons, and reductions in energy consumption. It should be noted that certain information for the notifications may be optional and further, the notifications as shown are merely examples for purposes of illustration and discussion. Certain other information may be included or excluded from notifications as desired. For example, a notification can include information regarding energy consumption over past days, a current day energy consumption, and projected energy consumption for one or more days in the future.

Figure 8:
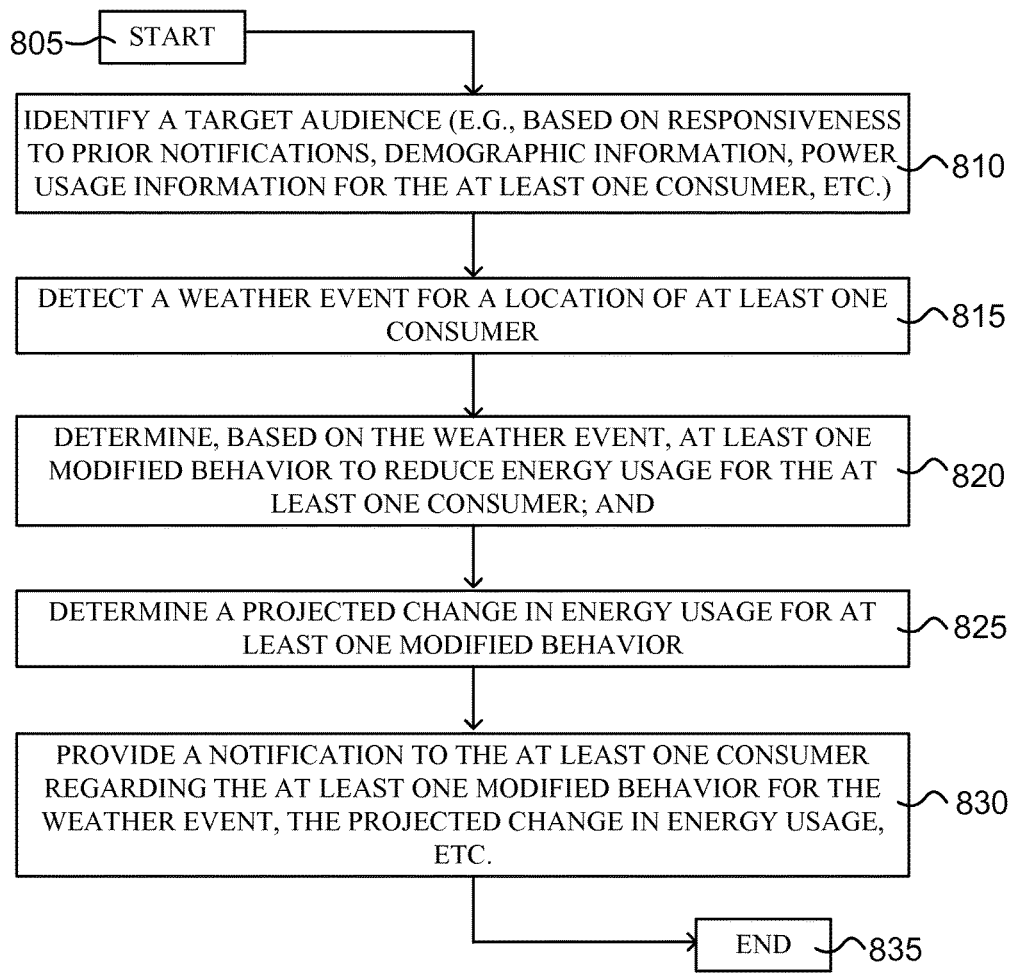
FIG. 8 is a schematic block diagram of a simplified procedure for providing notifications to one or more consumers regarding energy consumption.

FIG. 8 illustrates an example simplified procedure 800 for providing notifications to one or more consumers regarding energy consumption in accordance with one or more embodiments described herein (e.g., from the perspective of notification system 130). Procedure 800 may start at step 805, and continues to step 810, where, as described in greater detail above, notification system 130 identifies a target audience. As discussed in greater detail above, the target audience may be identified based on various factors, including, for example, energy or power usage, energy coefficients for a building, demographic information, responsiveness to prior notifications, and the like.

Procedure 800 continues to step 815, where notification system 130 detects a weather event for a location of at least one consumer. For example, notification system 130 may determine a temperature (predicted, actual, or historical) is above or below a threshold temperature ($T_{threshold}$) to detect the weather event. Alternatively (or in addition), notification system 130 may determine a change in temperature ($\Delta T$) for a time period (t) and compare the $\Delta T/t$ to a threshold change $\Delta_{threshold}$ to detect the weather event, as discussed above. For example, notification system 130 may detect a warm period and then identify a cooling event based on forecasted weather being colder than the warm period temperature more than a threshold delta.

Notification system 130 further determines, in step 820, at least one modified behavior to reduce energy usage for the at least one consumer (e.g., for a building or buildings associated with the at least one consumer, etc.) based on the weather event. For example, the modified behaviors may include general and universal tips that apply to a large portion of consumers. However, in some embodiments, the modified behaviors may be tailored to individual consumers (e.g., based on house size, past behaviors, heating/cooling sources, number of windows, amount of insulation, etc.).

In some embodiments, notification system 130 may also determine, in step 825, a projected (or even actual) change in energy usage for the at least one modified behavior, as discussed above. For example, as discussed above, notification system 130 can determine a baseline energy usage for the consumer for the weather event based on historical energy usage for a building associated with the at least one consumer, attribute a portion of the baseline energy usage to a heating/cooling source, and determine a projected (or actual) energy savings for the weather event based on a difference between the baseline energy usage and the portion of the baseline energy usage attributed to the heating/cooling source.

Notification system 130 further provides a notification, in step 830, to the target audience—here, the at least one consumer—regarding a modified behavior, projected changes in energy usage, energy savings, and the like. Further, the modified behavior can include, for example, opening one or more windows of a building associated with the at least one consumer, turning off a heating source for the building, adjusting a thermostat temperature for the building, turning off a cooling source for the building, or preventing an amount of sunlight from entering the building. In some embodiments, the notifications may also include a comparison of energy usage, before, during, and after the weather event, as well as comparisons in energy savings to other consumers (e.g., other consumers in a similar demographic, in a similar geographic location, etc.), as discussed above. Procedure 800 may subsequently end at step 835, or it may continue again at step 810 where notification system 130 detects a weather event.

It should be noted that certain steps within procedure 800 may be optional, and further, the steps shown in FIG. 8 are merely examples for illustration—certain other steps may be included or excluded as desired. Further, while a particular order of the steps is shown, this ordering is merely illustrative, and any suitable arrangement of the steps may be utilized without departing from the scope of the embodiments herein. Moreover, while the steps are shown as independent steps, some steps may be further incorporated into other steps. By way of example, notification system 130 may perform additional filtering to consumers initially identified as a target audience throughout procedure 800 to refine the target audience intended to receive notifications.

The techniques described herein, therefore, provide for notifications to consumers to incentivize energy savings and/or advise consumers on when and how to save energy. These techniques particularly identify particular consumer behaviors associated with costly and/or wasteful energy consumption for specific weather events (e.g., cooling down, heating up, etc.). These notifications can significantly incentivize cost savings by reducing energy consumption. Further, the techniques target specific audiences to ensure the notifications reach relevant consumers.

While there have been shown and described illustrative embodiments that provide for notifications for a weather event, it is to be understood that various other adaptations and modifications may be made within the spirit and scope of the embodiments herein. For example, the embodiments have been shown and described herein with relation to specific temperatures, temperature thresholds, and changes in temperature. However, the embodiments in their broader sense are not as limited, and may, in fact, be used with any number weather related phenomena (e.g., precipitation, cloud-cover, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A power usage device, comprising:
   one or more network interfaces to communicate with in a communication network;
   a processor coupled to the network interfaces and configured to execute one or more processes; and
   a memory configured to store instructions executable by the processor, the instructions when executed by the processor, cause the processor to:
   evaluate responsiveness by a plurality of consumers to notifications of suggested behavior modifications for reducing energy consumption to identify a target audience of consumers that implemented the suggested behavior modifications;
   determine whether a temperature of a location of at least one consumer of the target audience of consumers crosses a threshold temperature for a time period;

in response to determining that the temperature of the location crosses the threshold temperature for the time period, determine a weather event, from amongst a plurality of weather events, for the location of the at least one consumer;

determine, based on the weather event, at least one modified behavior to reduce energy usage for the at least one consumer;

generate, by at least the processor, a notification that includes information regarding the at least one modified behavior;

transmit, via a network communication, the notification to remote computers of the at least one consumer regarding the at least one modified behavior for the weather event;

measure energy consumption of the at least one consumer to determine whether the at least one consumer implemented the at least one modified behavior; and update the target audience of consumers for subsequent transmission of notifications to remote devices for reducing energy consumption based upon whether the at least one consumer implemented the at least one modified behavior.

2. The power usage device of claim 1, wherein the instructions for determining the weather event are further configured to cause the processor to:

in response to determining that the temperature of the location is above the threshold temperature for the time period, determine a hot weather event, from amongst the plurality of weather events, for the location of the at least one consumer.

3. The power usage device of claim 1, wherein the instructions for determining the weather event are further configured to cause the processor to:

in response to determining that the temperature of the location is below the threshold temperature for the time period, determine a cold weather event, from amongst the plurality of weather events, for the location of the at least one consumer.

4. The power usage device of claim 1, wherein the instructions, when executed by the processor, are further configured to cause the processor to:

determine a projected change in energy usage for at least one modified behavior, and wherein, the instructions to provide the notification to the at least one consumer is further operable to provide the notification to the at least one consumer regarding the projected change in energy usage.

5. A tangible, non-transitory, computer-readable media having software encoded thereon, the software, when executed by a processor, cause the processor to:

evaluate responsiveness by a plurality of consumers to notifications of suggested behavior modifications for reducing energy consumption to identify a target audience of consumers that implemented the suggested behavior modifications;

detect a weather event for a location of at least one consumer of the target audience of consumers;

select, based on the weather event, at least one modified behavior from amongst a plurality of modified behaviors to reduce energy usage for the at least one consumer, the at least one modified behavior including opening windows at a residence of the at least one consumer;

in response to selecting the at least one modified behavior, generate a notification comprising instructions to open windows;

in response to generating the notification, transmit, via a network communication, the notification to a remote device of the at least one consumer;

measure energy consumption of the at least one consumer to determine whether the at least one consumer implemented the at least one modified behavior; and generate a subsequent target audience of consumers for subsequent transmission of notifications to remote devices for reducing energy consumption based upon whether the at least one consumer implemented the at least one modified behavior.

6. The tangible, non-transitory, computer-readable media of claim 5, wherein the software, when executed by the processor, is further operable to:

determine a change in temperature for a time period; and detect the weather event when the change in the temperature for the time period is greater than a temperature threshold.

7. The tangible, non-transitory, computer-readable media of claim 6, wherein the software, when executed by the processor, is further operable to:

select consumers to include within the target audience of consumers based on one or more weather events detected for one or more locations of the consumers; and control transmission of the notification based on the target audience of consumers, wherein the notification is transmitted, via the network communication, to only remote devices associated with each consumer in the target audience of consumers.

8. The tangible, non-transitory, computer-readable media of claim 6, wherein the modified behavior includes at least one of opening one or more windows of a building associated with the at least one consumer, turning off a heating source for the building, turning off a cooling source for the building, or preventing an amount of sunlight from entering the building.

9. A method performed by a power usage device comprising at least a processor coupled to a network and configured to execute instructions from a memory, wherein the memory is configured to store instructions executable by the processor, the method comprising:

evaluating, by at least the processor accessing the memory, responsiveness by a plurality of consumers to notifications of suggested behavior modifications for reducing energy consumption to identify a target audience of consumers that implemented the suggested behavior modifications;

determining, by at least the processor accessing the memory, whether a temperature of a location of at least one consumer of the target audience of consumers crosses a threshold temperature for a time period;

in response to determining that the temperature of the location crosses the threshold temperature for the time period, determining, by the processor accessing the memory, a weather event, from amongst a plurality of weather events, for the location of the at least one consumer;

determining by the processor accessing the memory, based on the weather event, at least one modified behavior to reduce energy usage for the at least one consumer;

generating, by at least the processor accessing the memory, a notification that includes information regarding the at least one modified behavior; and transmitting, by at least the processor via a network communication, the notification to remote computers of the at least one consumer identified in the target audience of consumers to convey the at least one modified behavior for the weather event.

10. The method of claim 9, further comprising:

measuring, by the processor accessing data from the memory, energy consumption of the at least one consumer to determine whether the at least one consumer implemented the at least one modified behavior; and updating, by the processing accessing the memory, the target audience of consumers for subsequent transmission of notifications to remote devices for reducing energy consumption based upon whether the at least one consumer implemented the at least one modified behavior.

* * * * *